United States Patent
Miller et al.

(10) Patent No.: US 7,532,714 B1
(45) Date of Patent: May 12, 2009

(54) METHOD FOR DISCRETE COMMUNICATION WITH A MEETING SPEAKER DURING A TELECONFERENCE

(75) Inventors: Steven M. Miller, Cary, NC (US); Travis M. Grigsby, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,743

(22) Filed: May 15, 2008

(51) Int. Cl.
*H04M 3/56* (2006.01)
*H04N 7/15* (2006.01)

(52) U.S. Cl. .............. 379/202.01; 348/14.08; 370/260; 455/416

(58) Field of Classification Search .............. 379/202.01–206.01, 158; 348/14.08; 370/260; 455/416
See application file for complete search history.

(56) References Cited

U.S. PATENT DOCUMENTS

| | | | |
|---|---|---|---|
| 6,069,943 A * | 5/2000 | David et al. | 379/202.01 |
| 6,178,237 B1 * | 1/2001 | Horn | 379/202.01 |
| 6,373,936 B1 | 4/2002 | Raniere et al. | |
| 6,628,767 B1 | 9/2003 | Wellner et al. | |
| 6,870,919 B2 | 3/2005 | Dobler | |
| 7,133,513 B1 | 11/2006 | Zhang | |
| 7,236,580 B1 | 6/2007 | Sarkar et al. | |
| 2003/0026406 A1 | 2/2003 | Ernstrom et al. | |
| 2003/0112947 A1* | 6/2003 | Cohen | 379/202.01 |
| 2003/0125954 A1 | 7/2003 | Bradley et al. | |
| 2003/0185371 A1 | 10/2003 | Dobler | |
| 2004/0117218 A1 | 6/2004 | Friedrich et al. | |
| 2004/0141605 A1 | 7/2004 | Chen et al. | |
| 2006/0031290 A1 | 2/2006 | Mannaru et al. | |
| 2007/0037536 A1 | 2/2007 | Battaglini et al. | |
| 2007/0263805 A1 | 11/2007 | McDonald | |
| 2008/0031433 A1 | 2/2008 | Sapp et al. | |
| 2008/0069012 A1 | 3/2008 | Decker et al. | |

FOREIGN PATENT DOCUMENTS

WO    03071774 A1    8/2003

* cited by examiner

*Primary Examiner*—Harry S Hong
(74) *Attorney, Agent, or Firm*—Weitzman Law Offices, LLC; Kenneth S. Weitzman

(57) ABSTRACT

A method for discrete communication with a meeting speaker during a teleconference, comprising receiving a soft mute request and blocking other teleconference participants from hearing any sound from the soft mute participant. A discrete voice message to the meeting speaker from the soft mute participant is received and converted to text representation, which is outputted for viewing by the meeting speaker or other party.

1 Claim, 2 Drawing Sheets

METHOD FOR DISCRETE COMMUNICATION WITH A MEETING SPEAKER DURING A TELECONFERENCE

BACKGROUND

1. Field of the Invention

This disclosure relates generally to teleconference systems and, more particularly, to a method and system that allows teleconference participants to communicate directly with a meeting speaker without a meeting operator.

2. Description of Related Art

Teleconference systems bring multiple parties together from remote locations. Ideally, teleconference systems allow participants to communicate with each other as if they were seated in the same room. A teleconference system typically includes at least two stations (e.g., mobile telephone, landline telephone, etc.) set up in remote locations interconnected by a transmission system, such as a global network or a telephone system.

During a teleconference, a participant may wish to communicate with the meeting speaker directly without being overheard by other participants. Currently, this is done by entering a key sequence on a touch-tone phone and speaking with a meeting operator, who is then responsible for relaying the message to the meeting speaker. This method requires a dedicated operator to manage these requests during the conference call.

Utilizing a dedicated operator increases costs associated with teleconferencing. Furthermore, an operator is not obligated to keep communications between a participant and a meeting speaker private. Therefore, it is desirable to remove the meeting operator dependency, but still have the ability to communicate discretely with the meeting speaker during a teleconference.

BRIEF SUMMARY

In one aspect of this disclosure, a computer implemented method is disclosed for discrete communication with a meeting speaker during a teleconference. The method comprises receiving a soft mute request and blocking other teleconference participants from hearing any sound from the soft mute participant. A discrete voice message to the meeting speaker from the soft mute participant is received and converted to text representation, which is outputted for viewing by the meeting speaker or other party.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWING

This disclosure is further described in the detailed description that follows, with reference to the drawing, in which.

DETAILED DESCRIPTION

This application discloses a system and method for discrete communications between a teleconference participant and the meeting speaker during a conference call. The input provided to the meeting speaker may not be made a direct part of the conference audio stream. A teleconference participant (the "soft mute participant") may invoke this system and method by entering a key sequence on a touch-tone telephone or similar device. Once the participant enters the appropriate key sequence, the soft mute participant is said to be in "soft mute" status. In one embodiment, the soft mute participant may speak the message to be discretely transmitted to the meeting speaker, which audible message is converted to a text representation using known voice recognition technology prior to being displayed to the meeting speaker. Another embodiment allows the soft mute participant to send a message to the meeting speaker using dual-tone multi-frequency ("DTMF") signaling, which DTMF message is converted to a text representation using known DTMF conversion technology prior to being displayed to the meeting speaker.

Figure 1:
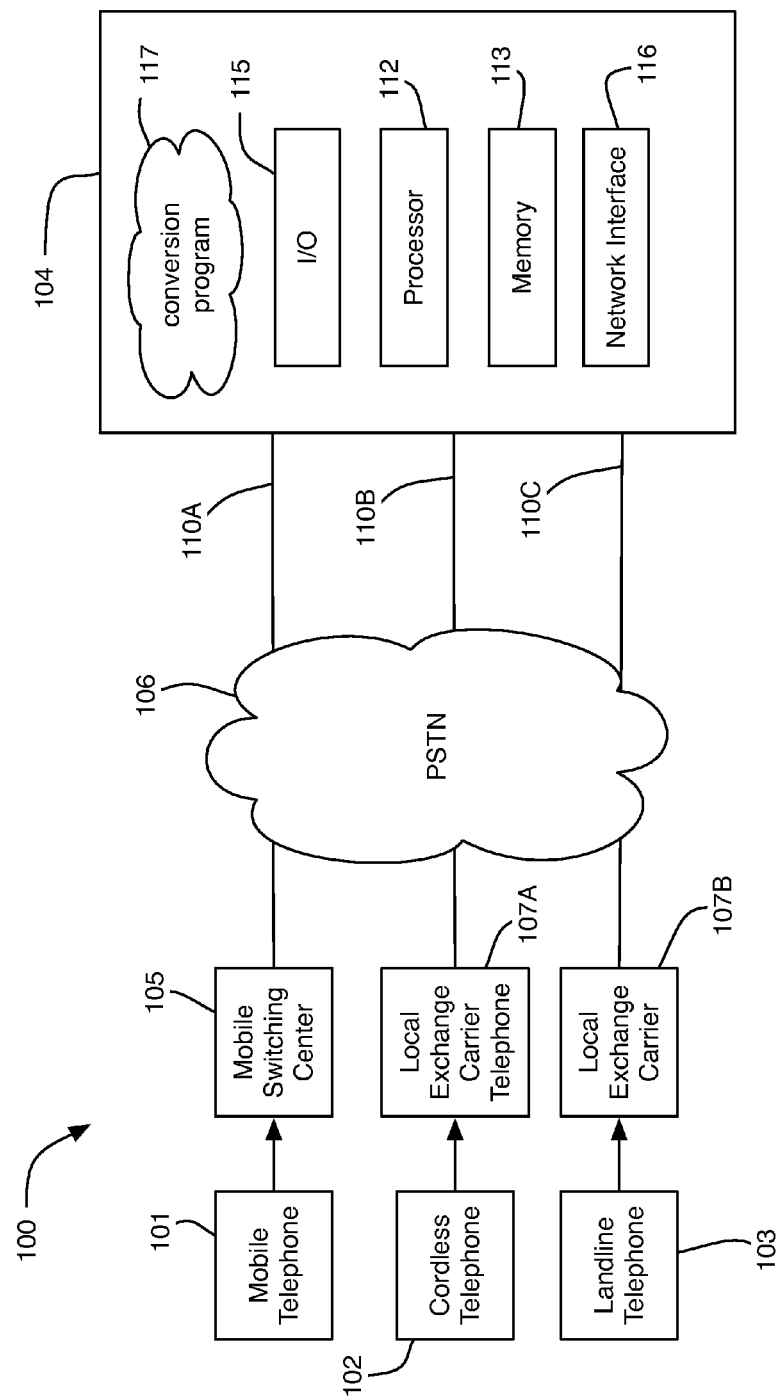
FIG. 1 is a schematic of an exemplary teleconference system.

FIG. 1 illustrates an exemplary teleconference system 100 that may include one or more mobile telephones 101, one or more cordless telephones 102, and one or more landline telephones 103. Mobile telephone 101 may, for example, be connected to a conference bridge 104 or similar system via a mobile telephone switching center 105 and a Public Switched Telephone Network ("PSTN") 106. Mobile telephone switching center 105 connects the PSTN 106 to mobile phone 101. PSTN 106 may be connected to conference bridge 104.

Similarly, cordless telephone 102 may, for example, be connected to the conference bridge 104 or similar system via a local exchange carrier ("LEC") 107A and the PSTN 106. LEC 107A enables cordless telephone 102 to gain access to conference bridge 104 via the PSTN 106. Furthermore, landline telephone 103 may, for example, be connected to the conference bridge 104 or similar system via a LEC 107B and the PSTN 106. LEC 107B enables landline telephone 103 to gain access to conference bridge 104 via the PSTN 106.

The conference bridge 104 or similar system may be a computer configured to connect callers of mobile telephones 101, cordless telephones 102, and landline telephones 103 together, such as on a conference call. Conference bridge 104 may also be configured to monitor the conference call session, as well as electronically balance the lines 110A, 110B, and 110C so that each participant can hear and speak to all the other participants no matter how many participants hop on or off the call.

It is understood that FIG. 1 is illustrative of an embodiment of a teleconference system 100 and the teleconference system is not intended to be limited in scope to any one particular embodiment. For example, although the method and system is described as being implemented using a conference bridge 104 or similar system, it is understood that the disclosed system and method may be implemented in connection with live streaming or broadcasting over a computer network without the requirement of a conference bridge. Similarly, it is understood that teleconference system 100 may include any number of mobile telephones 101, cordless telephones 102 and landline telephones 103. Moreover, other mobile devices, such as a personal digital assistant ("PDA"), may also be used to connect with a conference call session.

Conference bridge 104 preferably includes a program 117 containing a series of programming instructions to convert voice or DTMF signals into text representations. Conventional speech recognition software for converting a user spoken utterance to a text representation and DTMF converters for producing text representations of DTMF signals may be utilized. The text representation may be displayed on any output device coupled (directly or indirectly) to input/output interface 115, such as a monitor. Conference bridge 104 may include a processor 112 coupled to a memory 113. Processor 112 may be configured to execute the instructions of program 117 stored in memory 113.

The various aspects, features, embodiments or implementations of the system and method described herein can be used alone or in various combinations. The method disclosed in the present application may be implemented using software, hardware, or a combination of hardware and software. The disclosed method may also be embodied as computer readable code on a computer readable medium. The computer readable medium may be any data storage device that can store data and thereafter be read by a computer system. Examples of the computer readable medium include read-only memory, random access memory, CD-ROMs, flash memory cards, DVDs, magnetic tape, optical data storage devices, and carrier waves. The computer readable medium may also be distributed over network-coupled computer systems so that the computer readable code is stored and executed in a distributed fashion.

Conference bridge 104 preferably contains software that accepts a "soft mute" request from any participant to allow that participant to send a discrete message to the meeting speaker. A soft mute request may be initiated by entering a predetermined key sequence (e.g., "555") on a touch-tone telephone keypad. Once a soft mute request is received, conference bridge 104 may invoke additional software that prevents other participants from hearing any sounds originating from the soft mute participant until the participant's soft mute state has ended. The participant's soft mute status may be terminated when the participant enters the same key sequence or another predefined key sequence. In addition, the soft mute status can be controlled by voice command by the meeting participant(s). Alternatively, soft mute status can be the default for callers joining the conference, or the conference owner or administrator can initiate soft mute status for some or all of the conference participants. Similarly, the soft mute status can be enabled or disabled at will for participant by an authorized party, such as an administrator.

Conversion program 117 may use known voice recognition techniques to convert the soft mute participant's voice signal into a text representation (e.g., ASCII text) to be viewed by the meeting speaker. The discrete text representation may be displayed on the meeting speaker's monitor connected (directly or remotely) to the input/output interface 115. Any type of graphic interface may be used to display the soft mute participant's discrete message. The graphic interface may be a series of programming instructions executing on conference bridge 104.

Alternatively, the soft mute participant may initiate the soft mute process and type a discrete message to the meeting speaker using the touch tone keypad of the telephone or other device used by the soft mute participant. Conversion program 117 may be programmed to convert DTMF signals from the soft mute participant's telephone into a text representation (e.g., ASCII text) to be viewed by the meeting speaker. DTMF converters are known in the art. In this embodiment, conference bridge 104 may contain software that prevents other participants from hearing the key tones produced while the discrete message is typed by the soft mute participant.

It is understood that conversion program 117 may execute on another computer similar in architecture to conference bridge 104, which may be connected to and synchronized with the conference bridge 104.

Figure 2:
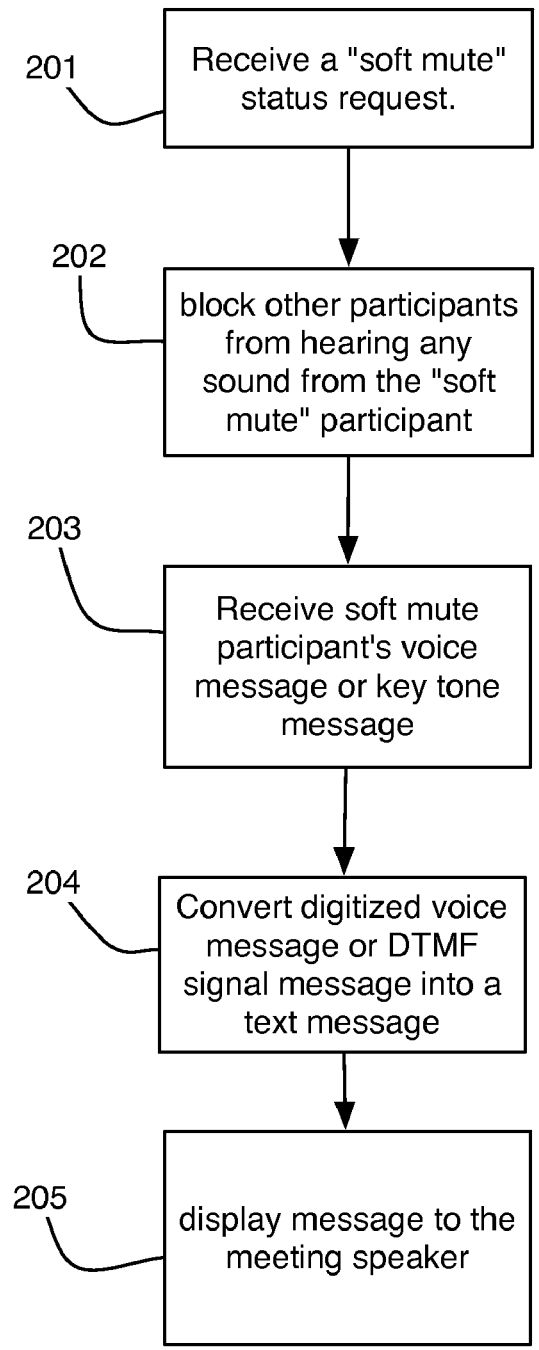
FIG. 2 illustrates the preferred steps for establishing soft mute status during a conference call and transferring a discrete message to the meeting speaker.

FIG. 2 illustrates the preferred steps for establishing soft mute status during a conference call and transferring a discrete message from the soft mute participant to the meeting speaker. In step 201, conference bridge 104 or similar system receives a request from a participant (e.g., user of mobile phone 101) to initiate soft mute status. In step 202, other participants (e.g., users of cordless telephone 102 and landline telephone 103) are blocked from hearing any sound originating from the soft mute participant.

Once the soft mute function is activated, the soft mute participant may create a discrete message to be viewed by the meeting speaker by either speaking into the soft mute participant's telephone or typing (or otherwise inputting) the message on the telephone's keypad. In step 203, the conference bridge 104 (or other computer system) receives the soft mute participant's discrete voice message or discrete typed message, which may be in a DTMF format. In addition to the message information delivered, an audible signal or message may be provided to the meeting speaker, owner or administrator. Such messages could simply indicate the availability of a message, or could include additional information, such as the type of message, participant identification, number or length of messages, numerical responses from DTMF or voice signals, etc.

In step 204, the received voice message or DTMF typed message is converted into a text representation (e.g., ASCII text file) in a conventional manner, such as by using known speech recognition software for converting a user-spoken utterance to a text representation or known DTMF converters for producing text representations of DTMF signals. The soft mute participant's converted text message is outputted and displayed for viewing by the meeting speaker in step 205. Alternatively, the stream of soft mute information may be viewed by the larger audience through appropriate interfaces.

The above-described method and system, therefore, facilitates discrete communication between a teleconference participant and the meeting speaker during a conference call that is not made a direct part of the conference audio stream. It may be desirable to have the soft mute input captured as part of a persisted audio or multimedia stream recorded for replay purposes. No teleconference operator intervention is required for the participant to provide a discrete message to the meeting speaker.

It is understood that the method and system disclosed herein may also be utilized for, among other things, users or participants providing feedback, screening of users or participants to be placed into queue for live Q&A, etc. The system and method may also include transcription of user or participant comments (e.g., convert voice to text and send to meeting speaker/coordinator/moderator) for compilation after the meeting ends.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A computer implemented method for discreet communication with a meeting speaker making a presentation to an audience of teleconference participants, comprising:

receiving a soft mute request from a participant desirous of discreetly communicating with the meeting speaker during the presentation;

blocking other teleconference participants from hearing any sound from the soft mute participant;

receiving a discreet voice message to the meeting speaker from the soft mute participant;

converting the voice message to a text representation; and outputting the text representation for viewing by the meeting speaker during the presentation by the meeting speaker.

* * * * *